US012748436B2

(12) United States Patent
Arzich et al.

(10) Patent No.: US 12,748,436 B2

(45) Date of Patent: Sep. 29, 2026

(54) METHOD, SOFTWARE PROGRAM PRODUCT, AND DEVICE FOR SAFETY-ORIENTED SPEED MONITORING OF AN AUTONOMOUS MOBILE UNIT

(71) Applicant: Siemens Aktiengesellschaft, Munich (DE)

(72) Inventors: Martin Arzich, Eggermühlen (DE); Thomas Kahabka, Pommelsbrunn (DE); Maximilian Walter, Nuremberg (DE); Lennart Kilian, Gauting (DE); Rene Graf, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 90 days.

(21) Appl. No.: 18/871,014

(22) PCT Filed: May 23, 2023

(86) PCT No.: PCT/EP2023/063767

§ 371 (c)(1),
(2) Date: Dec. 2, 2024

(87) PCT Pub. No.: WO2023/232555

PCT Pub. Date: Dec. 7, 2023

(65) Prior Publication Data

US 2025/0370470 A1 Dec. 4, 2025

(30) Foreign Application Priority Data

Jun. 2, 2022 (EP) .................................... 22177019

(51) Int. Cl.
*G05D 1/633* (2024.01)

(52) U.S. Cl.
CPC .................................... *G05D 1/633* (2024.01)

(58) Field of Classification Search
CPC ............. G05D 1/633; G05D 1/86; G05D 1/87
See application file for complete search history.

(56) References Cited

U.S. PATENT DOCUMENTS

2020/0073401 A1 3/2020 Szatmary et al.
2020/0290205 A1 9/2020 Hammes et al.
(Continued)

FOREIGN PATENT DOCUMENTS

DE 102018220018 A1 * 5/2020 .............. H04W 4/44
DE 102019111642 B3 * 6/2020 ............. G05D 1/245
(Continued)

OTHER PUBLICATIONS

Machine Translation of Schulz's reference (DE-102018220018-A1) (Year: 2018).*
(Continued)

*Primary Examiner* — Tarek Elarabi
(74) *Attorney, Agent, or Firm* — Lempia Summerfield Katz LLC

(57) ABSTRACT

A method for safety-oriented speed monitoring of an autonomous movement unit, a software program product, and an apparatus are provided. A speed of an autonomous movement device is determined without additional special hardware. Components that are required for the use of an autonomous movement device anyway are used. These components, or data determined by the components, are suitably combined with one another on corresponding software with the aid of a programmable controller, thus making it possible overall to safely determine a current speed, specifically without use of additional hardware.

31 Claims, 3 Drawing Sheets

(56) References Cited

U.S. PATENT DOCUMENTS

| | | | | |
|---|---|---|---|---|
| 2020/0355830 | A1 * | 11/2020 | Missbach | G08G 1/166 |
| 2022/0009353 | A1 | 1/2022 | Hess et al. | |

FOREIGN PATENT DOCUMENTS

| | | | |
|---|---|---|---|
| JP | 2020520008 | A | 7/2020 |
| JP | 2020184334 | A | 11/2020 |
| JP | 2022521938 | A | 4/2022 |

OTHER PUBLICATIONS

PCT International Preliminary Report on Patentability mailed May 15, 2024 corresponding to PCT International Application No. PCT/EP2023/063767.

* cited by examiner

METHOD, SOFTWARE PROGRAM PRODUCT, AND DEVICE FOR SAFETY-ORIENTED SPEED MONITORING OF AN AUTONOMOUS MOBILE UNIT

This application is the National Stage of International Application No. PCT/EP2023/063767, filed May 23, 2023, which claims the benefit of European Patent Application No. EP 22177019, filed Jun. 2, 2022. The entire contents of these documents are hereby incorporated herein by reference.

BACKGROUND

The present embodiments relate to safety-oriented speed monitoring of an autonomous movement unit.

Autonomous movement units (e.g., autonomous mobile robots (AMR)) and other driverless vehicles such as forklift trucks are being increasingly used in the industrial environment for the transport of materials. The type C standards ISO 3691-4:2020 (Industrial trucks-Safety requirements and verification-Part 4: Driverless industrial trucks and their systems) and EN 1525:1997 (Safety of industrial trucks-Driverless trucks and their systems) provide guidelines that are intended to provide personal protection of persons working in the environment. Safety-oriented controllers (SPLC or F-PLC) are also being used more and more frequently in the implementation of safety devices. Safety-oriented or failsafe provides that a person is reliably detected in an area and the vehicle is safely switched off when this person enters the area.

The EN 61508 series "Functional safety of electrical/electronic/programmable electronic systems" is the basic safety standard that deals with the functional safety of electrical, electronic, and programmable electronic systems irrespective of use. It is therefore the central standard for the topic of functional safety of control systems.

Safety-oriented laser scanners, which are connected to the emergency stop switches and the actuators by a safety-oriented control unit, may be used for personal protection.

The monitoring fields of such safety-oriented laser scanners are often static, which results in a restriction of the maximum speed. It is also possible to adaptively switch the size of the monitoring fields based on the speed and direction of the vehicle.

FIG. 1 shows a scenario with an autonomous movement unit 100 having a safety-oriented controller 110 and an optical sensor LS. The autonomous movement device 100 moves in different directions of movement depending on the type of drive. Vx points forward. The minimum speed Vmin, maximum speed Vmax, and speeds V1, V2 between them are illustrated. The rotational speed Vw also allows the movement device to rotate in further directions and is also to be taken into account in the further consideration. An encoder ENC monitors the movement of the wheels; this is understood as being an encoder for forming signals from movements. The encoder ENC may generally operate optically, magnetically, or mechanically with contacts. There are measuring transducers or input devices that detect the current position of a shaft or of a drive unit, and output the current position as an electrical signal. A distinction is made between two types of encoders: rotary encoders are installed on rotating components (e.g., on a motor shaft), and linear encoders may be installed on components with straight movements.

DE 10 2019 111 642 B3, for example, shows a similar apparatus: a vehicle having a safety system that has a kinematic sensor for monitoring the speed and an optoelectronic safety sensor for monitoring the environment. The movement information relating to the vehicle is used to compare the speed value from the first sensor with the type of movement from the second sensor.

The intention is now to prevent a person (or a further vehicle) P from moving into the safety area of the movement device 100 at their own speed 102.

For vehicles with a differential drive (e.g., two drives) or kinematics with only a steering axle and an axis of rotation, as is conventional with forklift trucks, the effort involved in calculating the safety-oriented speed is not problematic.

However, the calculation effort in the safety-oriented part of a programmable logic unit increases in vehicles with omnidirectional drives (e.g., a Mecanum drive; a vehicle that is equipped with Mecanum wheels).

The speed vector Vx, Vy, and the rotation W are dependent on the individual speeds of the wheels V1, V2, V3 and V4. In this case, R stands for the radius of the Mecanum wheels. The following formula illustrates the calculation of the forward kinematics:

$$(v_x, v_y, \omega)^T = \begin{pmatrix} \sin\phi & -\sin\phi & -\sin\phi & \sin\phi \\ -\cos\phi & -\cos\phi & \cos\phi & \cos\phi \\ \frac{1}{4R} & \frac{1}{4R} & \frac{1}{4R} & \frac{1}{4R} \end{pmatrix} (v_1, v_2, v_3, v_4)^T$$

In addition to the increased calculation effort, which is computation-intensive and therefore cost-intensive on a safety-oriented controller, a safety-oriented encoder is respectively required on each of the four axles. These accordingly require space and a safety-oriented connection to the safety-oriented controller.

Faults such as slip of the wheels cannot be excluded. This provides that a fault caused, for example, by further slipping during braking or by spinning of the wheels during acceleration cannot be excluded despite safety-oriented encoders.

Safety-oriented encoders have previously been used on the axles of the vehicle. The rotational speed is evaluated by a safety-oriented computing unit (F-PLC), with the result that the forward kinematics may be calculated. The fields of the laser scanners may then be switched based on the speed and the direction of travel in order to avoid collisions with persons.

Safety-oriented controllers and safety-oriented encoders have already been offered for this purpose, with the result that the speed and the direction may be calculated, and the monitoring fields may be switched accordingly. In this case, however, the type of kinematics is not freely definable, but rather, is available only for the customary kinematics (e.g., differential kinematics).

An example structure with a safety-oriented controller 203 is shown in FIG. 2. Safety-oriented encoders ENC monitor the movement of the drive 200. Optical sensors LS1, LS2 monitor a monitoring field 201, 202, in each case in the directions of travel of the autonomous movement device. These may be laser scanners, lidar, cameras in 1D, 2D, 3D, or the like. FIG. 2 does not illustrate emergency stop buttons that are also fitted to the movement device and make it possible to manually trigger an emergency stop.

SUMMARY AND DESCRIPTION

The scope of the present invention is defined solely by the appended claims and is not affected to any degree by the statements within this summary.

The present embodiments may obviate one or more of the drawbacks or limitations in the related art. For example, safety-oriented speed detection of more complex vehicles in line with the standards is implemented. The computing effort for the safety-oriented calculation is intended to be minimized.

A method for safety-oriented speed monitoring of an autonomous movement unit having at least one locomotion device with a movement detection system (e.g., encoder), and at least one environment detection system (e.g., camera, laser scanner, lidar, or the like) situated on the autonomous movement unit, has the following acts: a first movement vector is determined from first data relating to the movement unit based on measured values from the movement detection system using a first method; a second movement vector of the movement unit is determined from second data based on measured values from the environment detection system using a second method; and the first movement vector and the second movement vector are checked by a cross-comparison, and a statement on the validity and a movement vector considered to be safety-oriented are output as the result.

As another example, an apparatus for the safety-oriented speed monitoring of an autonomous movement unit is provided. The apparatus includes: at least one locomotion device with a movement detection system (e.g., encoder), where a first movement vector may be determined based on measured values from the movement detection system; at least one environment detection system situated on the autonomous movement unit, where a second movement vector of the movement unit may be determined from second data based on measured values from the environment detection system; a diagnostic unit for checking the first data and the second data; and a programmable controller for checking the first movement vector and the second movement vector using a cross-comparison, and for making safety-oriented decisions for the movement unit based on a checking result obtained from the diagnostic unit, where a statement on the validity and a movement vector considered to be safety-oriented may be output as the result.

BRIEF DESCRIPTION OF THE DRAWINGS

The invention is also graphically illustrated in more detail by the figures, in which.

DETAILED DESCRIPTION

A solution for safely determining the speed of an autonomous movement device AMR that manages without additional special hardware is provided. In the proposed solution, only components that are required for the use of an AMR anyway are used. These include a programmable controller (e.g., programmable logic controller (PLC)) that may make safety-oriented decisions. This is needed anyway to safely stop the AMR, for example, in order to avoid the collision with an obstacle. These also include an optical system/optical sensor for scanning obstacles. Such a system may be present in AMRs in order to determine position in space (e.g., non-safety-oriented) as part of navigation. The optical sensor may carry out one-dimensional, two-dimensional, or three-dimensional detection. These include, for example, all types of cameras, stereo camera (2D, 3D), a laser scanner (e.g., a movably mounted laser scanner), or lidar, which generate a point cloud during detection. These also include a system for measuring movement of wheels of the AMR (e.g., odometry). These also include the encoders mentioned. This system is needed anyway to control the drives (e.g., in a non-safety-oriented manner).

There are also further possible ways of determining the speed of a vehicle, for example: calculating the speed by visual odometry of a camera aimed at a fixed location such as the floor or the ceiling; calculating the speed using visual odometry of a 3D camera directed into the space; and calculating the speed using position and time delta of two locating tags of a cartesian 3D localization system.

Any two methods may be combined with one another for the principal proposed here. The prerequisite for safety is that physically different measurement principles are used in both channels.

These components, or the data determined by the components, are now suitably combined with one another on the corresponding software with the aid of the programmable controller, thus making it possible overall to safely determine the current speed, specifically without use of additional hardware.

Figure 3:
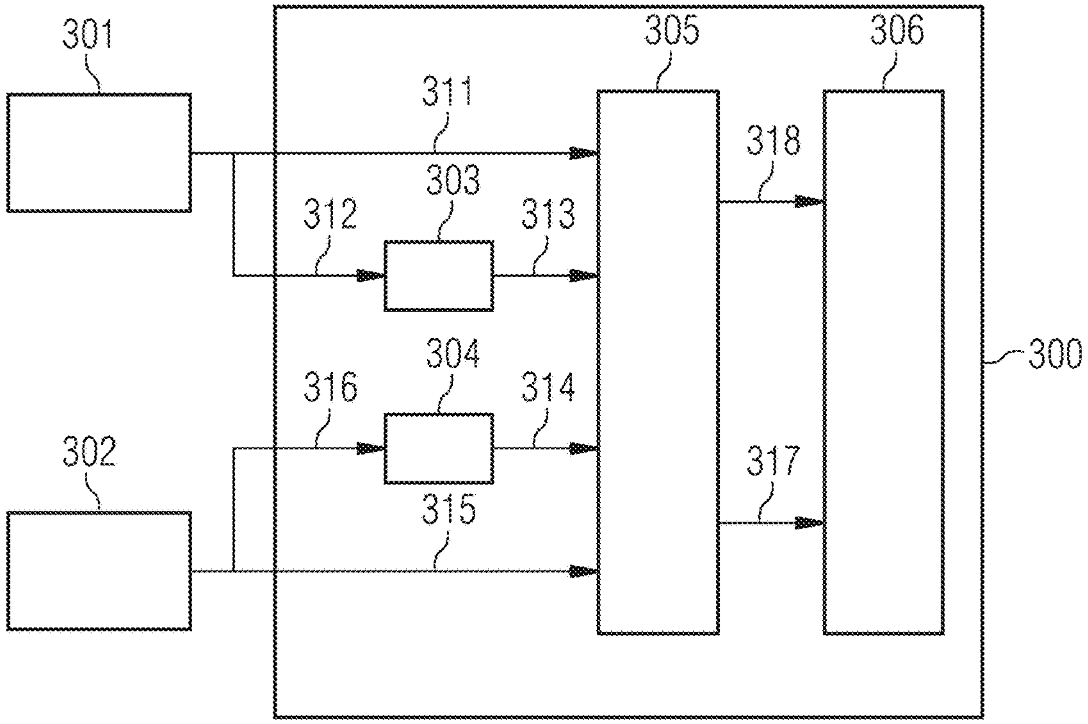
FIG. 3 shows an overview of a method according to an embodiment.

FIG. 3 shows how the above-mentioned components may be arranged. In the example embodiment, the optical sensor 301 (e.g., laser scanner, possibly also a plurality of laser scanners (LS, LS1, LS2)) cyclically provides a software module "scan matcher" 303 with a point cloud 311 of all detected obstacles. Each point cloud generated in this manner is provided with a time stamp. The scan matcher calculates a speed vector 313 (e.g., x component, y component, and current rotational speed w) by comparison with the point cloud of the last cycle.

At the same time, a movement sensor 302 (e.g., rotary encoder, encoder), for example, provides the software component 304 "forward transformation" with the current positions of the monitored axle or axles of the AGV. The forward transformation likewise calculates the speed vector (e.g., vx, vy, w) by reference to the axle positions of the last cycle. In this case, the movement of the locomotion device 200 is detected by detecting in each case an axle position of the locomotion device isochronously (e.g., in real time) at at least two times using a rotary encoder or another movement sensor, and providing this axle position with a time stamp. The movement vector is calculated from the at least two determined axle positions relative to times using a forward transformation 304.

The optical sensor, movement sensor (odometry), scan matcher, and forward transformation need not be implemented in a safety-oriented manner. For example, already existing components may be used for this purpose.

The two individual speed vectors are determined or calculated in diverse ways using independent and different measurement methods and are now intended to be compared. An error affecting both channels results in differently incorrect results that may be detected by the subsequent comparison. Further, the calculation paths are completely separate in terms of software, but may run on the same hardware, with the result that further measures are to be taken in order to detect systematic errors in both calculations.

Figure 1:
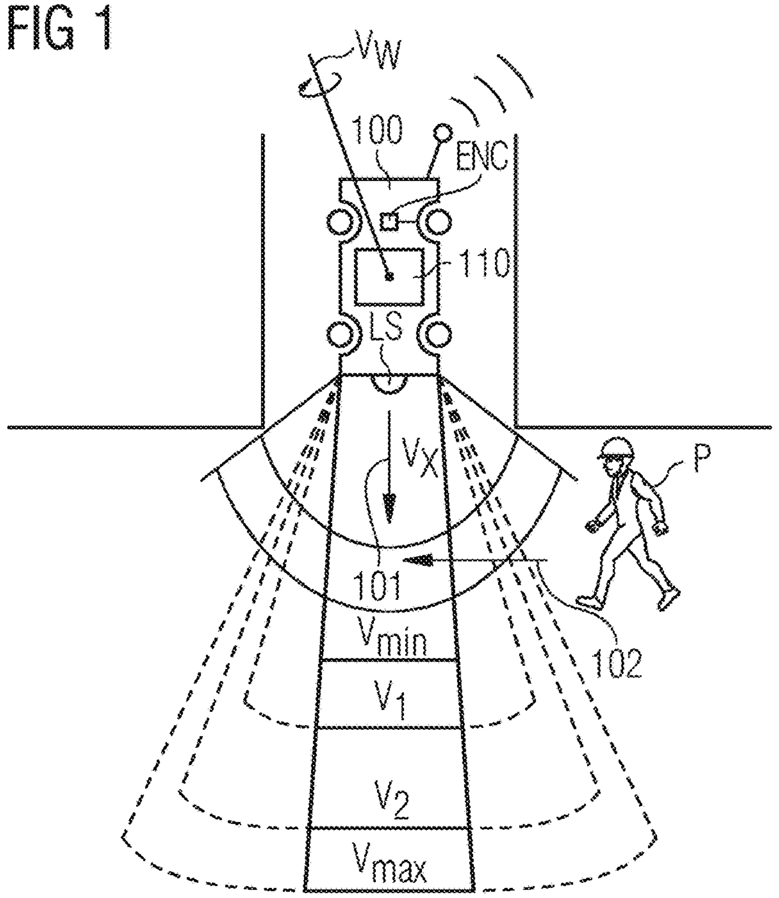
FIG. 1 shows an example application with an AMR.
Figure 2:
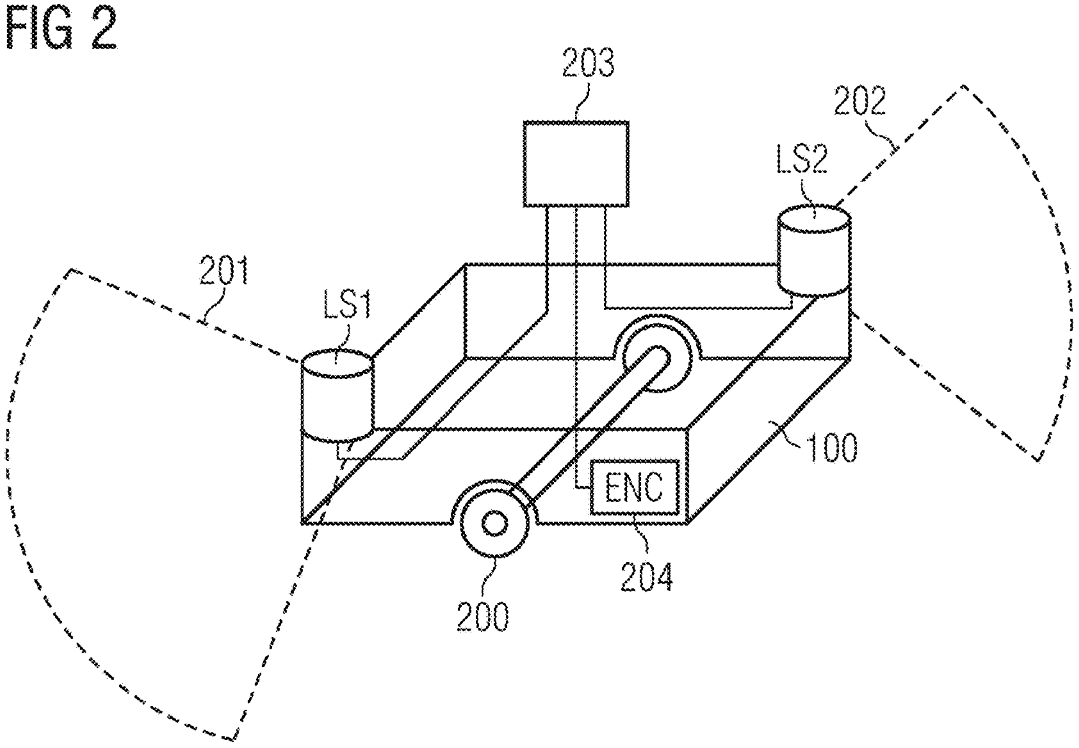
FIG. 2 shows an example structure of a known AMR.

Both speed vectors calculated in diverse ways and the original input data (e.g., the point cloud determined by the optical sensor+the axle increments determined by the movement sensor) are forwarded to the safe diagnosis 305. This is implemented using safe technology and carries out a plausibility and consistency check. If the check is successful, a speed vector 316 that is now considered to be safety-oriented is output and may be used for a safety-oriented decision 306. If an error is detected, the output "is Valid" 317 is deleted, and/or safe substitute values are provided (e.g., the maximum possible speed Vmax in order to thus activate the greatest protective fields; see FIG. 1).

The system is considered to be safe if either the actual speed is output or the output "is Valid" 317 has been deleted. The system is potentially unsafe if an incorrect speed is output and the output "isValid" 317 is set at the same time.

In order to minimize the probability of a potentially unsafe output, the following diagnostic measures are provided and are executed on the diagnostic unit 305 using safe technology. These are described in more detail below:

Plausibility check (PC) 321, 323
Cross-comparison (CC) 322
Diverse coordinate systems (DC)
Dynamization of the coordinate system (DYC)
Safe starting after a standstill (SVS)

1. Plausibility Check (PC) 321, 323

In one embodiment, the plausibility check 321, 323 includes: a check that the determined speed is in a predefined range of values; a check that the determined acceleration is in a predefined range of values; a check that there is noise in the determined values; a check that the determined movement corresponds to an expected movement pattern; or any combination thereof.

Figure 4:
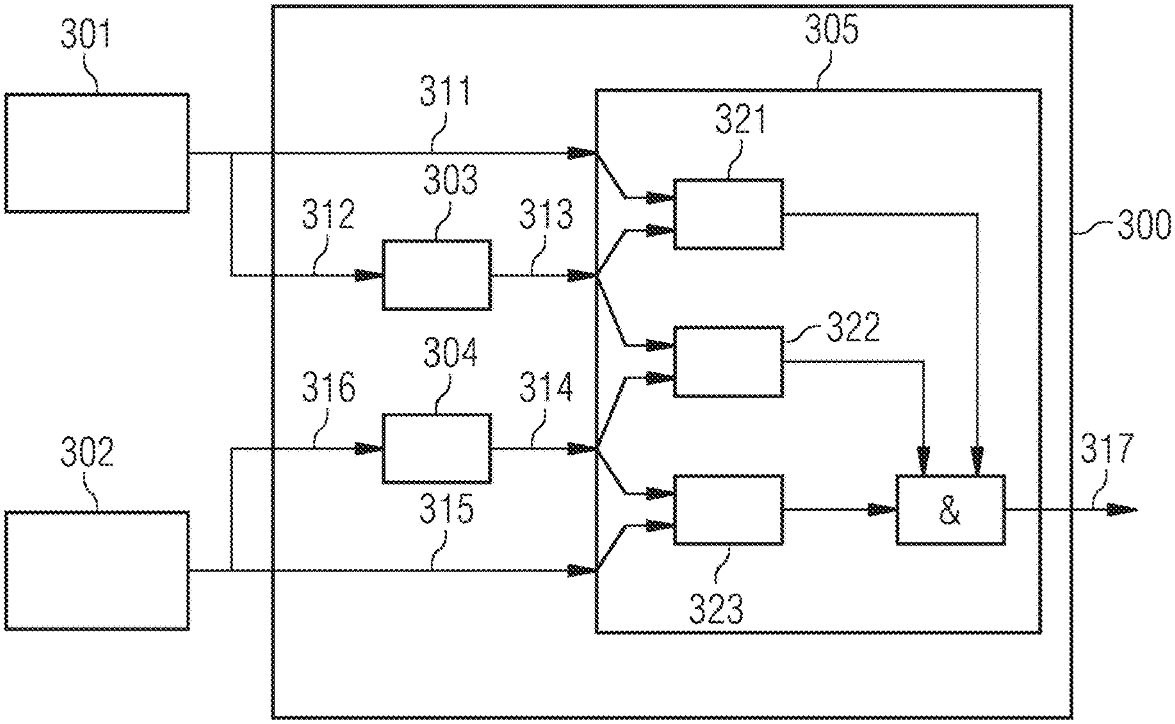
FIG. 4 shows a plausibility check of the method according to an embodiment.

Both input channels 311, 315 are checked for plausibility independently of one another (also see the illustration in FIG. 4). In detail, the following checks may be implemented, for example: Is the determined speed of the AMR in the specified range (e.g., is the determined speed of the AMR less than the maximum speed Vmax of the AMR?). This makes it possible to detect gross errors, such as the speed being mixed up with another process value.

Forming the first derivative makes it possible to determine whether the acceleration or deceleration is in a specified range. In the error-free case, it is not the case, for example, on account of the mass inertia, that the speed falls suddenly and unexpectedly to the value of zero. The failure of a sensor may therefore be quite easily detected in an advantageous manner.

In the error-free case, noise will also be detectable in each case in the original measured values from the optical sensor and/or movement sensor (e.g., point cloud or axle increments) (e.g., there is always a certain discrepancy between the measurement results at different times). If this is not the case, this is also deemed to be failure of the respective sensor (e.g., frozen sensor).

During operation, AMRs move at a constant speed only for a short time since the AMRs brake at corners, turn, and then accelerate again. If the speed of a channel does not change significantly over a longer time, it is likewise assumed that the sensor is frozen.

The failure of clocks that are used in the laser scanner to generate time stamps may be detected using a comparison with the failsafe clock in the diagnostic unit.

All plausibility checks are implemented in a safety-oriented manner. A failure of the tests themselves therefore need not be expected. If at least one test fails, the output is Valid 317 is deleted, or a safe substitute value is provided as the speed vector.

2. Cross-Comparison/Cross-Check (CC) 322

In the simplest case, the cross-comparison 322 consists of three comparisons of the components vx, vy, w of the speed vector in pairs (e.g., the values of the first movement vector 313 and of the second movement vector 314 are compared in pairs, and possibly the rotational angle). The magnitude of their difference is to be less than a threshold value t previously defined based on the technical key data relating to the AGV examined.

$$|vx1 - vx2| < t1$$
$$|vy1 - vy2| < t2$$
$$|w1 - w2| < t3$$

The values for t1, t2, t3 determine the accuracy of the output speed in the error-free case.

In one configuration, the Euclidean distance of the cartesian vectors vx and vy provided by the two channels is calculated in order to increase the accuracy:

$$sqrt\left[(vx1 - vx2)^2 + (vy1 - vy2)^2\right] < t4$$
$$|w1 - w2| < t3$$

In a further embodiment, the faster channel is deliberately buffered in order to compare speeds that were detected by the sensors at the same time, since both channels cannot be expected to have an identical response time.

Small measurement errors in the position may result in a comparatively large error in the calculated speed, which results in noise in the speed value. This noise may be reduced by filtering (e.g., FIR filter), but it is be taken into account that this filtering accordingly extends the response time.

The cross-comparison or the plausibility check 321, 323 is implemented in an entirely or at least partially functionally safe manner.

The cross-comparison itself is implemented in a safety-oriented manner (F-CPU); if it fails, the output isValid, and therefore the statement on the validity 317, is deleted.

The cross-comparison detects all errors that affect only one of the two channels.

3. Diverse Coordinate Systems (DC)

Figure 5:
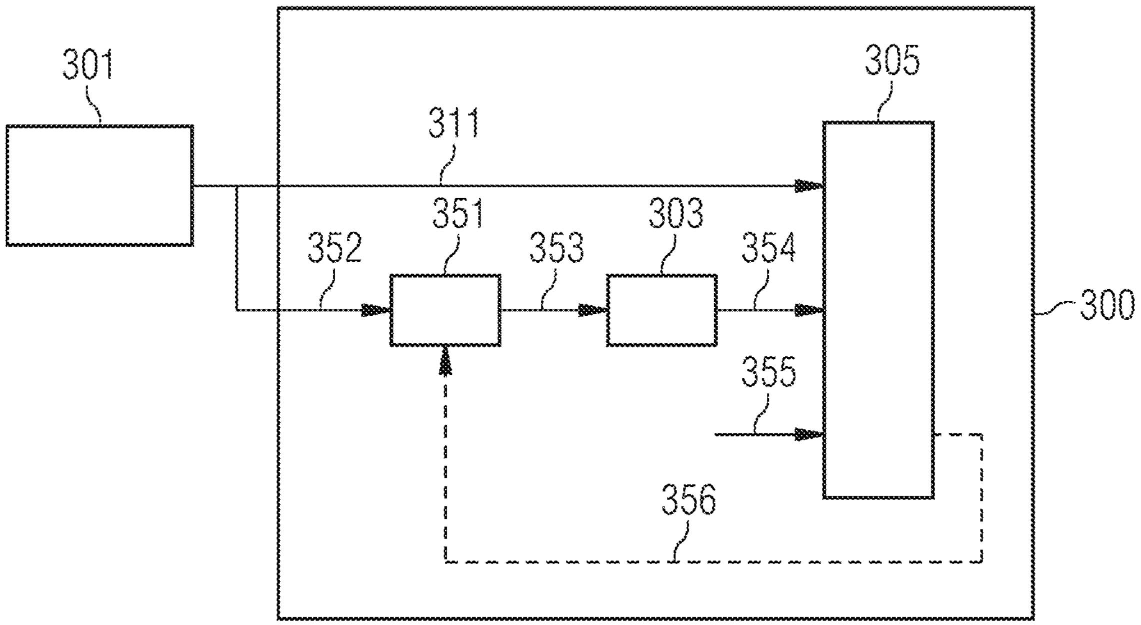
FIG. 5 shows the method with dynamization of the coordinate system.

FIG. 5 shows further embodiments. Random hardware errors that affect the output of the scan matcher 303 and the output of the forward transformation in the same manner may normally not be discovered by a cross-comparison. For example, if the value vx were overwritten with the same value in both cases, this may not be detected by the cross-comparison.

Therefore, the sensor data (e.g., point cloud) 311 from the sensor 301 is subjected to a coordinate system transformation before processing by the scan matcher. This may consist, for example, of: a shift (e.g., translation) of all points by a vector (tx, ty); a rotation of all points about a point (rx, ry) by the angle α; a scaling of all points along the X axis sx; a scaling of all points along the Y axis sy; any combination thereof.

The transformations may be time-independent (e.g., constant) or time-dependent.

A time-independent rotation by the angle α causes the result vx', vy' to likewise be (e.g., always be) interpreted as rotated by the angle α.

A time-dependent transformation provides that the change varies over time (e.g., the rotational angle becomes ever greater). For example, a time-dependent rotation by the angle α causes w' to be interpreted as being increased by a corresponding value.

The transformation results in the input of the scan matcher 303 being deliberately modified. The modification is reversed by the diagnostic unit 305 before the cross-comparison is carried out.

Random hardware errors that affect the output of the scan matcher and the output of the forward transformation in the same manner may be detected by the cross-comparison as a result of the deliberate modification. For example, if the values vx and vx' were overwritten with the same value, this would result in a different error syndrome in the two channels after reversing the modification. This results in detection in the cross-comparison.

4. Dynamization of the Coordinate System (DYC)

FIG. 5 shows a further measure that involves the dynamization of the diverse coordinate system. This provides that the coordinate system used in channel 1 of the sensor 311 changes at regular intervals of time. This makes it possible to reliably detect freezing or an undesirable delay in this channel.

The diagnostic unit changes the respectively valid transformation (e.g., at firmly set intervals of time). This may be selected using a predefined computing scheme or randomly.

The diagnostic unit continuously transmits 356 the currently valid transformation t to the modifier 351. A sequence number S that is delivered in all subsequent work steps is additionally sent. The transformed result (vx', vy', w'), together with the sequence number S, then reaches the diagnostic unit 305.

The sequence number provides information on the type of coordinate system transformation currently used.

Based on the sequence number, the diagnostic unit may decide which modification is to be reversed.

In addition, the diagnostic unit may use the sequence number to detect whether out-of-date data are present at the input or whether the calculation has required an impermissibly long time in the channel.

Impermissibly delays in the calculation in the scan matcher 303 may be detected, for example, by the dynamization of the coordinate system.

5. Safe Starting after a Standstill/Safe Vehicle Stop (SVS)

Figure 6:
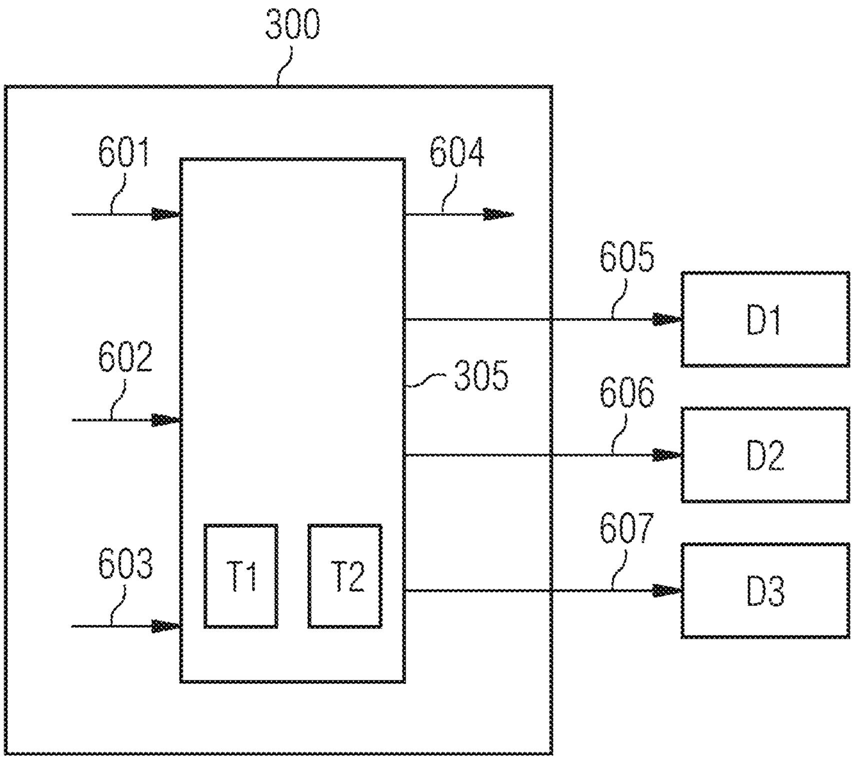
FIG. 6 shows the method and the special case of safe starting after a standstill.

FIG. 6 deals with the special case of the vehicle being at a standstill for a relatively long time. This may result in a potentially dangerous accumulation of errors. For example, channel 1 (e.g., the first sensor) may first freeze at the value of zero. Since this corresponds to reality at a standstill, this error cannot be detected. If channel 2 (e.g., the second sensor) now likewise freezes at the value of zero, an error is still not detected. However, during the next start, both channels provide the incorrect value of zero, which could result in a dangerous error (e.g., the speed of the vehicle is underestimated).

This error scenario is managed by the following measure.

If the vehicle is at a standstill for a certain time T1 (e.g., T1=5 seconds), the diagnostic unit 305 activates the safe standstill monitoring on all axles. During starting, the diagnostic unit is to be informed of the input "MovingOff" 601. In this case, the diagnostic unit ends the safe standstill monitoring and starts a time limiter T2 (e.g., 3 seconds).

In a first channel 602, the values may be obtained, for example, by a dynamized coordinate system, vx', vy', w', S. In a second channel 603, the coordinates vx, vy, w are received accordingly in the example.

The diagnostic unit checks whether starting has actually been carried out. If this is the case, this provides that no errors have accumulated in both channels during the standstill. If the time limiter T2 expires before starting is detected, this may be due to an accumulation of errors in the channels. In this case, the output "is Valid" 604 is deleted. Alternatively, the safe standstill monitoring may also be activated again in the axles in this case. If the vehicle has actually moved unnoticed, it is safely stopped thereby.

Corresponding commands 605, 606, 607 are transmitted to the drive units D1, D2, D3.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for safety-oriented speed monitoring of an autonomous movement unit comprising at least one locomotion device with a movement detection system, and at least one environment detection system situated on the autonomous movement unit, the method comprising:

determining a first movement vector from first data relating to the autonomous movement unit based on measured values from the movement detection system using a first method;

determining a second movement vector of the autonomous movement unit from second data based on measured values from the environment detection system using a second method; and checking the first movement vector and the second movement vector using a cross-comparison and outputting a statement on a validity and a movement vector considered to be safety-oriented as a result of the checking; and activating protective fields based on the statement on the validity and the movement vector, wherein a plausibility check is previously performed on the first data, the second data, or the first data and the second data, and checks whether there is noise in determined values, and wherein the first data and the second data are checked for plausibility independently of one another.

2. The method of claim 1, wherein the second method uses at least one optical sensor to scan surrounding environment.

3. The method of claim 2, wherein the at least one optical sensor carries out one-dimensional, two-dimensional, or three-dimensional detection.

4. The method of claim 3, wherein the at least one optical sensor includes a camera, a stereo camera, a laser scanner, or a lidar.

5. The method of claim 3, wherein the cross-comparison or the plausibility check is implemented in an entirely or partially functionally safe manner according to ISO 3691-2:2020, EN 1525:1997 and IEC 61508.

6. The method of claim 2, further comprising:

generating a point cloud by the at least one optical sensor for each scanning cycle during scanning; and providing each point cloud generated in this manner with a time stamp.

7. The method of claim 1, wherein the first method detects movement of the at least one locomotion device by detecting in each case an axle position of the at least one locomotion device isochronously at at least two times by a rotary encoder and providing the respective axle position with a time stamp.

8. The method of claim 7, wherein determining the first movement vector comprises calculating the first movement vector from the at least two detected axle positions relative to times by a forward transformation.

9. The method of claim 8, wherein the plausibility check comprises:

a check that a determined speed is in a predefined range of values;

a check that a determined acceleration is in a predefined range of values;

a check that the determined movement corresponds to an expected movement pattern; or any combination thereof.

10. The method of claim 1, further comprising deleting the statement on the validity when the plausibility check fails.

11. The method of claim 1, wherein values of the first movement vector and of the second movement vector are compared in pairs during the cross-comparison, such that it is determined whether a magnitude of a predetermined difference is exceeded.

12. The method of claim 1, wherein the first movement vector from the first data at a first determination frequency using the first method, wherein the second movement vector is determined from the second data at a second determination frequency using the second method, and wherein the determined data at least from the first method or the second method with a higher determination frequency is buffered.

13. The method of claim 1, wherein the second data is subjected to a coordinate system transformation based on measured values from the environment detection system before processing, and a resulting movement vector is subjected to a back-transformation before the cross-comparison.

14. The method of claim 1, wherein the second data is generated based on measured values from the environment detection system before processing with a sequence number that provides information on a type of coordinate system transformation currently used.

15. The method of claim 1, wherein the autonomous movement unit is intended to be started up again after a standstill, wherein the method further comprises:

carrying out a check, such that it is determined whether a speed has changed within a predefined period; and deleting the statement on the validity when the check generates a negative result.

16. An apparatus for safety-oriented speed monitoring of an autonomous movement unit, the apparatus comprising:

at least one locomotion device with a movement detection system, wherein a first movement vector is determinable based on measured values from the movement detection system;

at least one environment detection system situated on the autonomous movement unit, wherein a second movement vector of the movement unit is determinable from second data based on measured values from the environment detection system;

a diagnostic unit configured to check the first data and the second data; and a programmable controller configured to:

check the first movement vector and the second movement vector using a cross-comparison;

make safety-oriented decisions for the movement unit based on a checking result obtained from the diagnostic unit, wherein a statement on a validity and a movement vector considered to be safety-oriented are output-able as the result; and activate protective fields based on the statement of the validity and the movement vector, wherein a plausibility check is previously performed on the first data, on the second data, or on the first data and the second data, and checks whether there is noise in determined values, and wherein the first data and the second data are checked for plausibility independently of one another.

17. The apparatus of claim 16, wherein the environment detection system uses at least one optical sensor to scan surrounding environment.

18. The apparatus of claim 17, wherein the at least one optical sensor is configured to carry out one-dimensional, two-dimensional, or three-dimensional detection.

19. The apparatus of claim 18, wherein the at least one optical sensor includes a camera, a stereo camera, a laser scanner, or a lidar.

20. The apparatus of claim 17, wherein the at least one optical sensor is configured to generate a point cloud for each scanning cycle during scanning, and each point cloud generated in this manner is providable with a time stamp.

21. The apparatus of claim 16, wherein the movement detection system is configured to:

detect movement of the locomotion device via a first method by detection in each case of an axle position of the locomotion device isochronously at at least two times using a rotary encoder; and provide the respective axle position with a time stamp.

22. The apparatus of claim 21, wherein the first movement vector is calculated by a computing unit from the at least two detected axle positions relative to times using a forward transformation.

23. The apparatus of claim 22, wherein the diagnostic unit is further configured such that the plausibility check comprises:

a check that a determined speed is in a predefined range of values;

a check that a determined acceleration is in a predefined range of values;

a check that determined movement corresponds to an expected movement pattern; or any combination thereof.

24. The apparatus of claim 22, wherein the computing unit is configured to subject the second data to a coordinate system transformation based on measured values from the environment detection system before processing.

25. The apparatus of claim 24, wherein the diagnostic unit is further configured to generate a sequence number based on measured values from the environment detection system before processing, and wherein the sequence number provides information on a type of coordinate system transformation currently used.

26. The apparatus of claim 16, wherein the cross-comparison or the plausibility check is implemented in an entirely or partially functionally safe manner according to ISO 3691-2:2020, EN 1525:1997, and IEC 61508.

27. The apparatus of claim 16, wherein the diagnostic unit is further configured to delete the statement on the validity when the plausibility check fails.

28. The apparatus of claim 16, wherein the diagnostic unit is further configured to:

compare values of the first movement vector and of the second movement vector in pairs for the cross-comparison; and check whether a magnitude of a predetermined difference is exceeded.

29. The apparatus of claim 16, wherein:

the first data acquired by the environment detection system is determined at a first determination frequency;

the second data acquired by the movement detection system is determined at a second determination frequency; and the diagnostic unit is further configured to buffer the data at least from the first method or the second method with the higher determination frequency.

30. The apparatus of claim 16, wherein the autonomous movement unit is intended to be started up again after a standstill, and wherein the diagnostic unit is further configured to:

check whether a speed has changed within a predefined period; and delete the statement on the validity when the check generates a negative result.

31. A non-transitory computer-readable storage medium that stores instructions executable by one or more processors for safety-oriented speed monitoring of an autonomous movement unit comprising at least one locomotion device with a movement detection system, and at least one environment detection system situated on the autonomous movement unit, the instructions comprising:

determining a first movement vector from first data relating to the autonomous movement unit based on measured values from the movement detection system using a first method;

determining a second movement vector of the autonomous movement unit from second data based on measured values from the environment detection system using a second method; and checking the first movement vector and the second movement vector using a cross-comparison and outputting a statement on a validity and a movement vector considered to be safety-oriented as a result of the checking; and activating protective fields based on the statement on the validity and the movement vector, wherein a plausibility check is previously performed on the first data, the second data, or the first data and the second data, and wherein the first data and the second data are checked for plausibility independently of one another, and the plausibility check checks whether there is noise in determined values.

* * * * *